Sheet 1. 2 Sheets.
9413x
T. C. Barton.
Double-Acting Pump.
Patented Feb. 20, 1836.
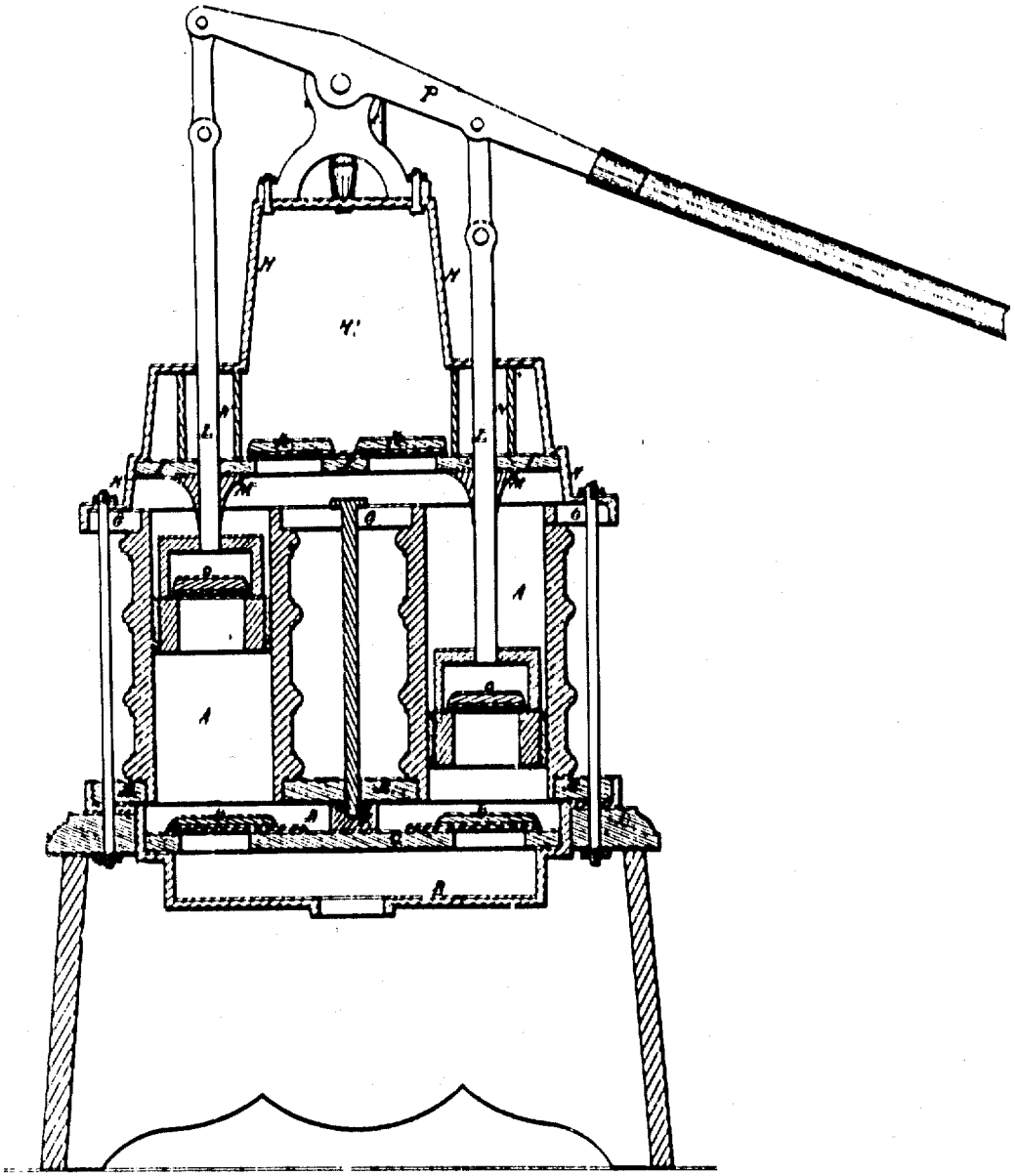

9413X

No 12
Feb. 20. 1836 [illegible]

Thomas C. Baxter Washington N. J.
Letters Patent

The schedule referred to in these Letters Patent and making
part of the same containing a description in the words of the
said Thomas C. Baxter himself of his improvement in the
[illegible] and forcing and Boring [illegible] pump [illegible]
[illegible] [illegible] whom it may concern Be it known that I Thomas
C. Baxter of Washington in the township of Mansfield
Warren County New Jersey have invented an improvement in
suction and forcing pumps which is applicable to those used
in Bee [illegible] and for other purposes and I do hereby declare
that the following is a full and exact description thereof ......
The Pump is [illegible] [illegible] [illegible] [illegible] [illegible] and [illegible]
[illegible] [illegible] [illegible] part of my improvement may be applied
[illegible] [illegible] [illegible] [illegible] [illegible] a log of sufficient length
[illegible] [illegible] [illegible] [illegible] [illegible] [illegible] [illegible] larger as they
[illegible] [illegible] The bottom of this log is to have a suction
pipe descending from it into the water that is to be raised.
Above this bottom there is a second or false bottom [illegible] [illegible]
[illegible] [illegible] chamber being allowed between the two. The [illegible] of
this false bottom forms the valve seat upon which the lower
[illegible] placed and which are [illegible] in the ordinary
way. The [illegible] [illegible] [illegible] upon a [illegible] which [illegible]
[illegible] [illegible] [illegible] [illegible] [illegible] above, and surrounding the
[illegible] [illegible] [illegible] [illegible] [illegible] valve chambers which
are [illegible] [illegible] [illegible] [illegible] [illegible] [illegible] the false bottom
[illegible] [illegible] [illegible] [illegible] the [illegible] upon which the [illegible] are
[illegible] [illegible] [illegible] [illegible] [illegible] the [illegible] [illegible] [illegible]
[illegible] [illegible] [illegible] [illegible] [illegible] [illegible] being [illegible] upon
[illegible] [illegible] [illegible] [illegible] [illegible] [illegible] [illegible] [illegible]
[illegible] [illegible] [illegible]
[illegible] [illegible] [illegible] and [illegible] the

9413X the Cylinders at their upper ends which [illegible]
into a [illegible] longer than [illegible] piece, which is [illegible]
[illegible] the cylinders
the [illegible] the Cylinders being [illegible]
[illegible] the [illegible] there
being [illegible] a false top [illegible] this into which
the [illegible] by each of the barrels and from which as
a common [illegible] pipe [illegible] be forced
through [illegible]. On the upper side of this false top there are
the valves [illegible] communicating with
the Chambers above each barrel.
The pistons [illegible] through holes in the false top.
immediately over the Centre of each barrel and to cause them
to [illegible] air and water tight [illegible]
[illegible] the false top by [illegible]
which [illegible] the ordinary purpose of [illegible]
[illegible]
piece of leather on the [illegible] side of the false top through [illegible]
[illegible] in the Centre of which leather the piston [illegible]
[illegible]
[illegible]
the [illegible] When [illegible] the leather and the piston [illegible]
[illegible] the [illegible]
[illegible]
[illegible] On the upper side of the false top the hole
through which the piston [illegible]
[illegible]
[illegible] the top of the [illegible]
[illegible]
[illegible]
[illegible]
[illegible]
[illegible]

guided in their stroke by friction rollers ...

What I claim as my invention is the manner of connecting the Cylinders with the upper and the lower Chambers by means of the flaps and rolling or ledges, which rotate in the manner described. I also claim the manner of surrounding the pistons by leather or other elastic material with loose elastic packing in the manner and for the purpose set forth and also the surrounding them with tubes and the application of the [illegible] [illegible] of the Communication between the water in the Chamber receptacle and that in the Cylinders. In constructing these pumps upon the principle and in the manner herein set forth I do not intend to confine myself to the exact form and construction described and represented in the drawing hereunto annexed, but to vary the same as I may think proper whilst I attain the same ends by analogous means. -

In testimony that the foregoing is a true and exact specification of my improvements in pumps for hydraulic purposes I have hereunto subscribed my name this thirtieth day of January in the year one thousand eight hundred and thirty six ...

Witnesses
[illegible] Williams
G. [illegible] Cochran

Thomas [illegible]

996 [illegible] (Patented February 20. 1836).

Drawing